Aug. 12, 1947.   R. W. STENZEL   2,425,354
ELECTRIC TREATER
Filed Feb. 23, 1940

INVENTOR
RICHARD W. STENZEL
BY
HARRIS, KIECH, FOSTER & HARRIS

ATTORNEYS

Patented Aug. 12, 1947

2,425,354

UNITED STATES PATENT OFFICE 2,425,354

ELECTRIC TREATER

Richard W. Stenzel, Long Beach, Calif., assignor to Petrolite Corporation, Ltd., Wilmington, Del., a corporation of Delaware Application February 23, 1940, Serial No. 320,337

2 Claims. (Cl. 204—307)

My invention relates to the resolution of emulsions and, more particularly, to a novel method and apparatus for resolving or preventing sludge accumulations in a separation zone in which the emulsion constituents are settled or otherwise separated by difference in specific gravity. Such separation usually follows the application of some emulsion-treating expedient, such as the use of chemicals, heat and pressure, or an electric field. The invention is particularly well adapted to the resolution or prevention of sludge in an electric treater used to resolve a water-in-oil emulsion, and will be particularly described in this connection.

The prevention of sludge accumulations is sometimes a problem in the electric dehydration of crude oil emulsions, though the problem in this industry is usually not severe. Such processes have for their purpose a reduction in the amount of water in the emulsion to produce a marketable oil. More recently, the electric process has come into general use in the purification of oils containing very little or no water, to remove various impurities which, upon heating in subsequent refinery equipment, may cause corrosion or deposition, or which may deleteriously affect the refinery products. The minimizing of sludge and the prevention of sludge accumulations in the electric treater are quite necessary in such processes, particularly as such purifying processes are conventionally operated on-stream with regard to the refining equipment and because increasing sludge accumulations represent not only an economic waste of oil but interfere seriously with the continuity of operation of the process. The present invention is particularly applicable to the solution of this problem and will be described with reference to such a purification process without intent to limit the invention thereto.

Such a purification process has for its object the removal from an oil of water-associable impurities, such as water-soluble or water-wettable materials. If the incoming oil contains water, it is often found that water-dissolved impurities are present dissolved in the dispersed water droplets. Commonly, such dispersed water droplets are of a salty nature and will be hereinafter referred to as brine droplets, i. e., droplets in which various salts or other impurities are present. Regardless of whether or not water is present in the oil, dispersed water-soluble or water-wettable solids may be present. The starting material for the purification process comprises such an oil containing impurities and containing no more than a few per cent of water.

The purification process involves emulsifying with such an oil a relatively fresh water, i. e., a water capable of taking up or becoming associated with the impurities when the resulting emulsion is subjected to the coalescing action of an appropriate electric field. The action in this field is to bring together the impurities and the relatively fresh water and to coalesce the dispersed water into masses of sufficient size to be separable from the oil, for example by gravitational separation. The emulsion is formed by any suitable means, typically a weight-loaded emulsifying valve, and should be of such character as to be readily treatable by the electric field. Best results are obtained by use of a limited mixing action and by avoidance of such intense mixing action as would predominantly combine the impurities and the relatively fresh water in the mixing step.

Under certain operating conditions and on certain oils, it has been found that such a purifying process tends to result in an accumulating sludge layer in the zone of separation between the body of treated oil and the body of separated water now containing the impurities. Such sludge accumulations, if allowed to continue, will in some instances render ineffective the electric field and will contaminate the effluent water or pervade the entire lower portion of the separating zone so that sludge, rather than water which is substantially oil-free, will be withdrawn.

Such sludge accumulations can usually be avoided by employment of a less intensive mixing action but this is usually at the expense of the high purification efficiency desired. Correspondingly, where the percentage removal of impurities is to be high, it is desirable to employ other means for preventing sludge accumulations. The present invention has been found to give excellent results in aiding in the resolution or preventing such sludge accumulations and, in its preferred form, includes a controlled agitation adjacent or in the sludge zone in a manner to generally improve the process, permit a higher degree of dispersion of the relatively fresh water, permit operation of the purification process at lower temperatures, etc.

The sludges with which this invention is primarily concerned can be considered as being of two types, herein-termed "coarse-grained sludge" and "fine-grained sludge". Both types are essentially of the water-in-oil type in that the dispersed phase is formed of water and the external or continuous phase is formed of oil or oily material. Both types comprise incompletely resolved emulsion and while, in some instances, either type may tend to separate into its constituents when permitted to stand for prolonged periods of time, they will not do so in commercial practice under the treater throughputs and operating conditions utilized.

The first type of sludge, namely coarse-grained sludge, is generally of a coarse, loose, or baggy nature. Its structure is of the honeycomb type in that it is constituted largely of water particles of substantial size, typically 1/16 of an inch in diameter or larger, surrounded by oily membranes or skins. Such water masses are the result of prior coalescence in or following the application of an electric field. The amount of oil or external phase associated with this type of sludge may be quite small and may be present largely in the oily membranes or sacs which enclose the relatively large water masses.

The formation of this type of sludge is believed to be due to the presence of irreversibly adsorbed material which is either in solid form initially or which solidifies after adsorption. As coalescence proceeds, the area to volume ratio of the dispersed droplets decreases so that the settling coalesced water masses carry with them relatively permanent membranes when such irreversibly adsorbed material is present. These tough membranes appear to prevent the coalesced water masses from further and immediately coalescing with the main body of water at the interface between the body of water and the sludge zone. When oils are being treated which give this characteristic type of sludge, observation of this interface through the body of water will show a large number of pendant globular sacs. The presence thereof tends to prevent other large water masses, not necessarily thus encumbered with membranes, from passing immediately to the body of water, and separation is impeded.

I have found that such globular sacs or membranes can be ruptured easily by controlled mechanical action, and it is an object of the present invention to set up a suitable agitation in a horizontal zone such that the rupturing or piercing of such membranes is facilitated, thus releasing the entrapped water so that it can enter the main body of water.

It is another object of the invention to move an agitation element adjacent such a sludge in a manner to shear or disrupt by mild turbulence such sacs or membranes. With this type of sludge, the zone of movement of the agitation element may determine the position of the sludge-water interface.

The second type of sludge, namely the fine-grained type, is usually a compacted water-in-oil emulsion in which the aqueous droplets are for the most part very small and represent droplets originally present in the untreated emulsion and droplets which have been somewhat increased in size by coalescence during treatment but not to the extent necessary for complete separation. The degree of compaction may vary up to an emulsion containing a very large amount of water. Such sludges may form when separating emulsion constituents which have been subjected to various actions tending to induce coalescence, such as subjection to the action of an electric field or use of suitable chemicals. This type of sludge represents the more serious problem in electrical purification processes as the small water droplets tend to settle gradually and accumulate in a region which is herein-termed a "sludge zone" between the bodies of purified oil and water.

Such compacted fine-grained sludges are, in some instances, stabilized by the irreversibly adsorbed materials described above. In many instances, this sludge is very highly concentrated in the impurities removed from the oil, and the invention works particularly well on such concentrated sludges. In other instances, however, the sludge may not be highly concentrated in the impurities and, in fact, the water content thereof may contain less of the impurities than does the water effluent from the treater.

I have found that a mild agitation in the sludge zone is instrumental in aiding resolution or preventing formation of this fine-grained type of sludge, and it is an important object of the present invention to induce such a mild agitation in a zone where sludge has either already formed or tends to form.

While all of the factors tending toward the formation of such fine-grained or "tight" sludge and the reasons for resolution thereof with the aid of mild agitation are not completely understood, tests indicate that this type of sludge tends to cluster or agglomerate if allowed to accumulate. Such clustering may be either reversible or irreversible. Mild agitation of a reversibly clustered sludge may cause the subdivision of the clusters into the individual emulsion droplets, but similar treatment of an irreversibly clustered sludge will tend to subdivide the clusters into smaller but still clustered droplets. However, a mild agitation in the sludge zone will prevent formation of such irreversibly clustered sludge and will, in fact, prevent the gathering together or clustering of the emulsion particles, by supplying suitable agitation to prevent their agglomeration. In view of the compacted nature of the sludge emulsion, its high concentration in impurities in some instances, and the relatively small size of the individual water droplets, it was not to be expected that such mild agitation would have any substantial effect in aiding the resolution to the extent that no undesirable accumulation of sludge occurred.

It is an object of the present invention to induce a mechanical agitation in a sludge zone to prevent clustering of a fine-grained sludge and to assist in the resolution of such sludge.

In certain instances, it is found desirable to induce an electric field below the main treating field and extending to the body of water in the lower end of the treater. It has now been found that if the mild agitation referred to above is set up in the zone immediately above the body of water, this auxiliary electric field can be used to assist the mild agitation in resolving and preventing the accumulation of fine-grained sludge, and it is an object of the invention to provide a novel method and apparatus for accomplishing this result.

Problems of sludge as encountered in the electrical purification process are distinctive in character and differ substantially from the problem of electrically dehydrating crude oil emulsions which contain particles all of one kind, typically particles of salty water. For example, if the purification process is used to remove salts, such, for example, as calcium chloride, magnesium chloride, and sodium chloride or other water-soluble salts, these being present in minute brine droplets in the incoming oil, the relatively fresh water will be emulsified therewith in such manner that two types of dispersed aqueous droplets are delivered to the electric field, one type comprising a relatively strong brine and the other a relatively fresh water. It is a necessary part of the purification process that coalescence take place between these two types of droplets under the action of the electric field, and that this "mixed" coalescence not only obtain initially, but also continue as between dilute brine droplets (formed as a result of the initial coalescence) and additional water droplets. As a result, there is a progressive change in the constitution of the dispersed phase during coalescence, and, in particular, the brine droplets coalesce with the relatively fresh water droplets to produce progressively more dilute droplets of augmented volume. This progressive dilution gives rise to effects which tend to oppose the continued coalescence of augmented masses to the desired magnitude. For example, hydrolysis of the alkaline earth chlorides, as induced by dilution with unbuffered water, tends to make the dilute brine more acidic, which is undesirable from the standpoint of coalescence. The density of the dilute brine is relatively low and the size of the coalesced masses of dilute brine necessary to obtain ready gravitational separation is greater than with the denser concentrated brine. These and other factors tend to slow down or prematurely stop the progressive coalescence to masses of the requisite size and, hence, there is a tendency in some instances for a portion of the emulsion to escape complete resolution and to appear as sludge. While this can usually be combatted to some extent by less intimately mixing the relatively fresh water with the incoming oil, this ordinarily results in a reduced degree of purification not desirable under the most exacting conditions. The present process of controlled mechanical agitation can be used to overcome sludging difficulties even while using the more intimate mixing action that is desirable for greater extraction efficiency.

While the process can be performed in a number of ways, continuously or intermittently, it is usually desirable, in commercial operation, to set up the agitation by continuously-operating means, and exemplary apparatus useful in this connection is shown in the appended drawing, in which.

Figure 1:
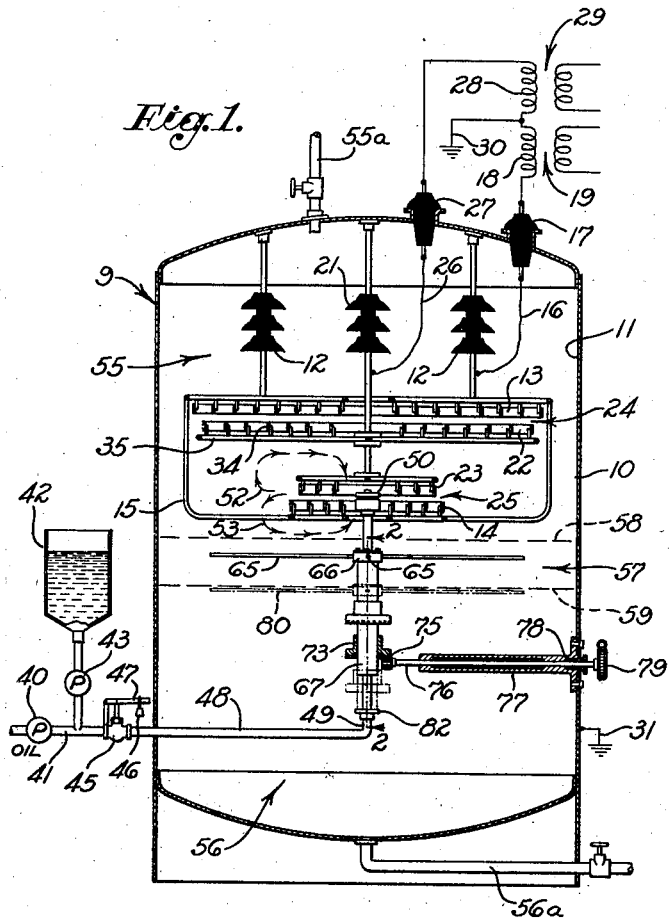
Figure 1 is a vertical sectional view of an electric treater incorporating the invention.

Referring particularly to Figure 1, the electric treater 9 illustrated includes a tank 10 enclosing a separating chamber 11. Suspended therein by insulators 12 are electrodes 13 and 14 mechanically and electrically interconnected by rods 15 and energized through a conductor 16 extending through bushing 17 and connected to one terminal of a secondary winding 18 of a transformer 19. Also suspended therein by insulators 21 is an intermediate electrode structure comprising electrodes 22 and 23, respectively cooperating with the electrodes 13 and 14 in defining upper and main treating spaces 24 and 25. The intermediate electrode structure is energized through a conductor 26 extending through a bushing 27 and connected to one terminal of a secondary winding 28 of a transformer 29. The remaining terminals of the secondary windings 18 and 28 are connected together and grounded as indicated by the numeral 30. The tank 10 likewise is grounded as indicated at 31. By connecting the transformers 19 and 29 in additive relation, a potential can be impressed across the treating spaces 24 and 25 which is equal to the sum of the voltages produced by these transformers. At the same time, the potential between any one of the electrodes 13, 14, 22, and 23 and any grounded portion of the equipment will be equal to the voltage developed by only one of the transformers 18 and 28.

As shown, each of the electrodes 13, 14, 22, and 23 comprises a plurality of concentric metallic rings, one of which is indicated by the numeral 34, which are retained by a suitable framework, for example outward-extending arms 35. This particular electrode structure is not per se a part of the present invention and various constructions can be used.

The oil to be purified, containing no more than a few per cent of water, is delivered by a pump 40 to a pipe 41. The relatively fresh water may be withdrawn from a tank 42 and proportioned into the pipe 41 by a pump 43. A preliminary mixture is thus formed and further mixing or emulsification can take place in a mixing means 45 with which the pipe 41 communicates. This means is shown as comprising a weight-loaded valve and the mixing action can be varied by shifting the position of a weight 46 on an arm 47 to produce the desired water-in-oil type of electrically-treatable emulsion.

This artificial emulsion is introduced into the tank 10 through a pipe 48 which communicates with a riser pipe 49 extending upward to a distributor 50, which discharges radially outward into the treating space 25. The entire electrode structure is submerged in an oil environment and the jetting of the emulsion outward into the treating space 25 tends to establish circulation of fluid through upper and lower internal recirculation paths, indicated respectively by the arrows 52 and 53, so that material is reintroduced into the field established in the treating space 25 both from a position above the electrode 23 and below the electrode 14.

For a more detailed description of the structure thus far described, reference is made to U. S. Patent No. 2,182,145, Harold C. Eddy. In that patent, there is described a mode of operation of such a structure in which an oil containing no more than a few per cent of water can be purified by incorporating thereinto a relatively fresh water to coexist in large measure with the impurities. Electric treatment in the tank 10 serves to bring the relatively fresh water and the impurities together and to coalesce the water into masses of sufficient size to gravitate from the oil. There is described therein a process in which substantially complete resolution of the artificial emulsion can be obtained with the aid of an electric field so that there is no such accumulation of sludge as would interfere with the maintenance of the electric field. Generally speaking, the conditions and the mode of operation set forth in that patent can be maintained in the treater herein-contemplated, but improved results will flow from the use of the present invention in conjunction therewith. In other instances, the conditions set forth in the Eddy patent supra can sometimes be departed from if the present invention is used. For example, the present invention permits more intimate mixing of the relatively fresh water and the incoming oil, without accumulation of such amount of sludge as would interfere with the continuity of the process. This invention is also particularly applicable to those oils which appear to have a distinct sludging tendency and which are sometimes difficult to handle at high throughputs and with high percentage removal of impurities without the use of auxiliary sludge-resolving aids.

In general, such a purification process works best if the following conditions are present: The incoming oil should be of such character as to withstand the electric stresses contemplated without breakdown. Its contents in the impurities mentioned above may vary over wide limits, but if any dispersed water is present therein, the amount thereof should be not more than a few per cent. Generally speaking, the lower the water content the more complete is the removal of impurities, and the process is commonly used on oils containing not more than 3% of water, though it can be used in some instances on oils containing up to about 8% of water. The amount of relatively fresh water used will be sufficient to take up the water-associable impurities. Most commonly, from 8–20% of relatively fresh water is used. By the term "relatively fresh water" reference is had to a water which, if it contains any of the impurities to be removed, has a materially less concentration thereof than does the dispersed water, or, if the oil carries no dispersed impurity-containing water, the term has reference to a water which has no more than a small concentration of the impurities to be removed. This water need not be entirely devoid of the impurities to be removed and, in some instances, may contain these impurities in relatively low concentration. It may also contain various chemicals assisting in the process.

It is preferable that electric treatment should take place under superatmospheric temperature. The oil or the relatively fresh water, or both, can be preheated, or the mixed stream can be heated prior to introduction into the field. Sufficient pressure is maintained in the tank 10 to prevent vaporization of the more volatile fractions or of the water. The intensity of the mixing action employed will vary with different oils, but should be sufficient to produce adequate removal of impurities yet sufficiently limited to form an artificial emulsion which can be ultimately resolved substantially completely into oil and water with the aid of the sludge-processing steps hereinafter disclosed.

Electric treatment in the tank 10 results in the separation of the electrically-treated constituents into a body of treated oil 55, positioned in a treated-oil zone of the separating chamber 11, and a body of separated water 56 which now contains in large measure the water-associable impurities originally present in the incoming oil and which collects in a water zone of the separating chamber 11. The treated oil will still contain a small amount of dispersed water but will usually contain less than 10% of the impurities present in the incoming oil. This treated oil can be withdrawn continuously from the separating chamber 11 by a pipe 55a, and, if desired, delivered directly to subsequent refinery equipment, or the treated oil may be temporarily stored before such refining. The separated water may be continuously withdrawn from the lower end of the separating chamber by a pipe 56a, and usually contains substantially no oil so that its disposal presents no serious problem.

It is found that, in some instances, there is a tendency for sludge to be present and to build up in a sludge zone between the bodies of oil and water. For purposes of explanation, this sludge zone has been indicated in general in Figure 1 by the numeral 57 and is shown as being bounded by dotted lines 58 and 59, indicating approximately the transition between the sludge layer and the bodies of oil and water, respectively thereabove and therebeneath. It should be understood, however, that the space between the dotted lines 58 and 59 need not be filled with sludge and that the sludge zone 57 represents rather a zone or region in which sludge tends to accumulate and build up. By use of the invention, it is sometimes possible to render any sludge layer practically non-existent and to use the invention to avoid the accumulation of sludge in the zone 57, though in other instances the invention can be brought into operation after formation of a sludge layer, in which event it will aid in resolving the sludge and will prevent such further accumulation of sludge as would otherwise build up and eventually short-circuit the electrodes or require that such sludge be withdrawn from the treater. It should further be understood that the boundary indicated by the dotted line 58 is somewhat indeterminate as the degree of compaction of the fine-grained sludge decreases progressively upward from the body of water 56. In general, however, the position of the dotted line 58 approximates the boundary between a potential or already-present sludge zone 57 and the body of treated oil 55. Likewise, the dotted line 59 represents the approximate boundary between the sludge zone and the body of water 56. As will be hereinafter mentioned, the interface between the sludge and the water is not necessarily a horizontal plane, but the dotted line 59 represents primarily the transition between an oil-continuous system and a water-continuous system.

Figure 2:
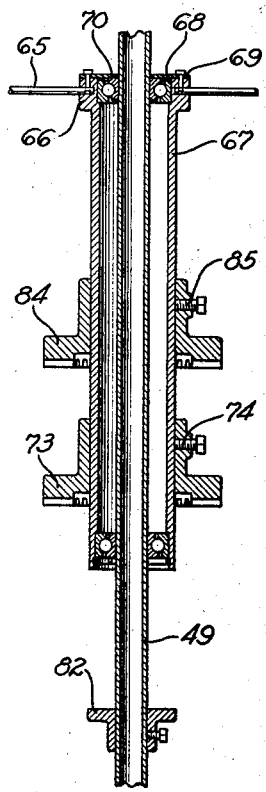
Figure 2 is an enlarged sectional view of the invention, taken along the line 2—2 of Figure 1.

It is desirable from the standpoint of the present invention to induce a mild circulation in the sludge zone 57, and this is accomplished in the embodiment shown in Figures 1 and 2 by disposing an agitating means comprising one or more arms 65 in this sludge zone and rotating them relatively slowly in a horizontal plane while avoiding substantial agitation between the sludge and the treated oil and between the sludge and the separated water.

The arms 65 may comprise horizontal rods extending outward from a rotatably-mounted structure. As shown, they are secured to a rotating head 66 forming a part of a sleeve 67 surrounding the riser pipe 49 and suitably journalled with respect thereto. As best shown in Figure 2, the head 66 may be thus journalled by a ball-bearing means, an outer race 68 of which is held in a cavity of the head 66 by a removable plate 69. An inner race 70 surrounds the riser pipe 49 and may be vertically slidable thereon to permit a change in position of the arms 65, as will be hereinafter described. The lower end of the sleeve 67 may be similarly journalled.

Any suitable means can be used for turning the rotating structure comprising the sleeve 67 and the arms 65 to secure the desired mild mechanical agitation. In Figure 2, a ring gear 73 is used in this connection, being attached to the sleeve 67 by a set screw 74. This ring gear meshes with a pinion 75 mounted on a horizontal shaft 76 journalled in a tube 77 affixed to the tank 10. The shaft 76 extends outward through a suitable stuffing box 78 and is rotated by any suitable means, such as a gear 79. This rotational movement is transmitted to the sleeve 76 through the ring gear 73 and serves to turn the arms 65 in a substantially horizontal plane.

It is sometimes desirable to dispose the arms 65 at the lower end or out of the sludge zone 57.

These arms may be in a position so close to the interface between the body of water and the material thereabove as to shear or break by agitation the depending membranes or sacs mentioned above, in which event the position of the arms will substantially determine the sludge-water interface. This position of the arms 65 will desirably be at or just below the dotted line 59, and Figure 1 shows this approximate position by dotted lines 80.

In the embodiment shown, the arms 65 and the sleeve 67 are retained in their full-line position by the pinion 75 which carries the weight of the rotating structure. If the inner races of the bearings are made slidable on the riser pipe 49, the arms 65 can be moved to their lower dotted line position by pulling outward on the shaft 76 until the pinion 75 disengages the ring gear 73, thus permitting the rotating structure to drop down until the lower end of the sleeve 67 contacts an adjustable plate 82 secured to the riser pipe 49. This plate is adjusted in position with respect to the surface of the body of water 56 to permit the arms to assume the approximate position indicated by the dotted lines of Figure 1. At this time, the shaft 76 can be moved inward and the pinion 75 meshed with an upper ring gear 84 adjustably secured to the sleeve 67 by a set screw 85. Return of the rotating structure to its upper full-line position can be obtained in various ways, or the tank 10 can be opened and the structure raised manually so as to be held in its upper position by the pinion 75.

Figure 3:
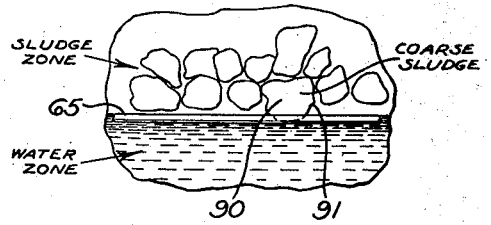
Figure 3 is a diagrammatic view illustrating one mode of operation of the invention when treating coarse-grained sludge.

Describing first the operation of the arms 65 when in their dotted line position indicated by the numeral 80, reference should be had to Figure 3. Here, there is shown extending downward into the body of water certain portions of the coarse-grained sludge. For example, one mass of sludge is indicated by numeral 90 and comprises an internal mass of water surrounded by membrane 91 which depends downward to be in the path of travel of the arms 65, or so close thereto as to be disrupted by the movement of these arms. In actual operation, it is found that the rotating arms, when in this dotted line position, shear, puncture, or break such depending sacs or membranes to release the water masses therein and permit immediate coalescence thereof with the body of water 56. In effect, the arms in this position define the position of the sludge-water interface and facilitate downward movement through the sludge zone and into the body of water 56 of other coalesced water masses moving downward from the zone of electric treatment. Correspondingly, the rate of separation of the water is materially increased by the arms 65 when operated in this position.

If the arms 65 are operated in their upper, full-line position, they will serve to establish a mild agitation in the sludge zone which is very beneficial in preventing sludge accumulations of such character and in such amount as would interfere with the maintenance of the electric field at proper coalescing potential. Several functions are performed by this mild agitation. In the first place, if a layer of fine-grained sludge has already formed, such agitation tends to prevent continued clustering of the sludge. If the already-present sludge is clustered, the mild agitation causes subdivision thereof either into individual emulsion droplets or smaller sludge clusters, depending upon whether the clustering is of the reversible or irreversible type which allows them to be picked up by the internal circulation currents and redelivered into the electric field for coalescence and resolution to particles of sufficient size for gravitational separation and union with the main body of separated water. Aspiration from the sludge zone into the main treating space 25 is very desirable as drawing into the field a portion of the agitator-modified sludge. Further, an electric field impressed on the sludge zone is usually advantageous in further assisting in the sludge resolution, but it is not essential in all instances, as will be hereinafter pointed out. Such an electric field may extend upward from the separated body of water to the lower live electrode 14 or upward from the arms 65 to this live electrode, in which event it will extend across at least a portion of the sludge zone or the layer of sludge therein.

In the second place, if the sludge zone is not already filled with sludge, the agitation induced in this zone by the arms 65 serves to prevent increasing sludge accumulations and to prevent such clustering as would take place in the absence of this agitation. Rotation of the arms 65 at all times during the energization of the electrodes will thus serve to overcome sludge difficulties.

In the third place, such agitation in the sludge zone ruptures the sacs or membranes surrounding the relatively large water masses present in, or tending to produce, the coarse-grained type of sludge hereinbefore referred to. This releases the entrained water for prompt coalescence with the body of water. Correspondingly, such sacs or membranes tend to be disrupted whether the arms 65 are in their upper or lower positions.

Figure 4:
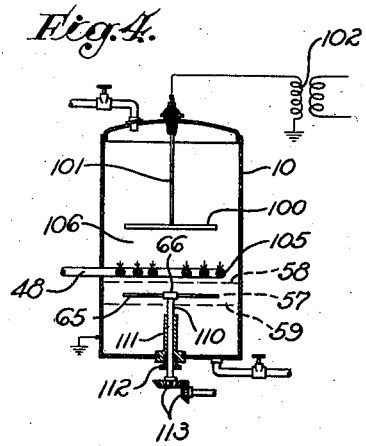
Figure 4 is a sectional view of a modified form of electric treater incorporated in the invention.

The embodiment shown in Figure 4 is indicative of the efficacy of the above-described agitation in overcoming sludge difficulties even when no electric field is present in the sludge zone. Here, the tank 10 contains a horizontal electrode 100 energized by a conductor 101 extending to one terminal of the secondary winding of a transformer 102, the remaining terminal being grounded and thus connected to the tank 10. The lower electrode in this embodiment is formed by a pancake-type coil of pipe 105 which is grounded to the tank 10. This coil serves as a distributor for the incoming emulsion moving through the pipe 48, and provides perforations for projecting the emulsion into a treating space 106 defined between the electrode 100 and the pipe coil 105.

In operating this type of treater, the sludge zone 57 will be beneath the lower electrode formed by the pipe coil 105 and will be approximately bounded by dotted lines 58 and 59 of Figure 4. The arms 65 forming the agitating means previously described are shown as disposed in this sludge zone and as extending outward from the head 66 which, in this instance, is mounted on a shaft 110 journalled in a bearing 111 secured to the tank 10, the shaft 110 extending through a stuffing box 112. Rotation of the shaft 110 is effected by any suitable means, such as the bevel gears 113 shown in Figure 4.

In this embodiment of the invention, the lower electrode substantially shields the sludge zone 57 from any electric stress. Notwithstanding, this type of treater has been operated very successfully in conjunction with the agitation-inducing means, and stable operation for extended periods of time can be achieved if the arms 65 are rotated. On a typical oil, stopping the rotation of such arms caused the building up of a substantial sludge layer and the short-circuiting of the electrode 100 shortly thereafter. However, it was found that if the arms 65 were put into operation just before short-circuiting of the electrode took place, the sludge layer which had already accumulated could be gradually decreased in volume and stable operating conditions again obtained. This is the result of the breaking up of the clustered brine particles so that they have further opportunity for coalescence with other water droplets until they are of sufficient size for separation from the oil and union with the water layer.

If desired, the arms 65 in the embodiment shown in Figure 4 can be lowered to rotate in a position corresponding to the dotted lines in Figure 1 when the coarse-grained or flocculent type of sludge tends to be formed. However, when the fine-grained type of sludge tends to form, the agitation is most effective in the upper position.

While the invention has been particularly described with reference to an electric purification process, it is also applicable in general to electrical dehydration of petroleum emulsions or to other systems in which bodies of oil and water tend to separate with a layer of sludge therebetween. The present invention can be used to improve the general operation of such other processes and, in some instances, insures continuity of operation which could not otherwise be obtained.

Various changes and modifications can be made without departing from the spirit of the invention as defined in the appended claims.

I claim as my invention:

1. In an electric treater, the combination of: a tank containing superimposed bodies of treated oil and separated water respectively occupying oil and water zones, there being a sludge zone therebetween; spaced electrode means in said oil zone above said sludge zone for establishing an electric field therebetween; a riser pipe extending vertically in said tank through said sludge zone; a discharge means for jetting emulsion from the interior of said riser pipe directly into said electric field at a position between said electrode means in a manner to draw material from said sludge zone into said electric field for electrical treatment thereof in said field; an arm means extending horizontally outward in said sludge zone from a position near said riser pipe; means for journalling said arm means on said riser pipe to move in a substantially horizontal plane in a locus of motion lying exclusively within said sludge zone; and means for slowly turning said arm means to move same through said sludge zone to modify the sludge in a manner facilitating its electrical treatment when drawn into said field.

2. In an electric treater, the combination of: a tank containing superimposed bodies of treated oil and separated water respectively occupying oil and water zones, there being a sludge zone therebetween; electrode means in said oil zone for establishing an electric field; discharge means for delivering the fluid to be treated to said electric field at a position above said sludge zone; an agitating means comprising arms extending horizontally outward in said sludge zone to contact any sludge tending to collect in said sludge zone; means for journalling said agitating means to move about a vertical axis whereby said arms move through a substantially horizontal path exclusively in said sludge zone; and means for slowly turning said agitating means.

RICHARD W. STENZEL.

REFERENCES CITED

The following references are of record in the file of this patent:

UNITED STATES PATENTS

| Number | Name | Date |
|---|---|---|
| 2,001,809 | Worthington | May 21, 1935 |
| 1,947,704 | Fisher | Feb. 20, 1934 |
| 2,182,145 | Eddy | Dec. 5, 1939 |
| 2,033,567 | Worthington | Mar. 10, 1936 |
| 1,438,048 | Marsh | Dec. 5, 1922 |
| 1,838,016 | Eddy | Dec. 29, 1931 |
| 2,083,798 | Roberts | June 15, 1937 |